Patented Oct. 10, 1933

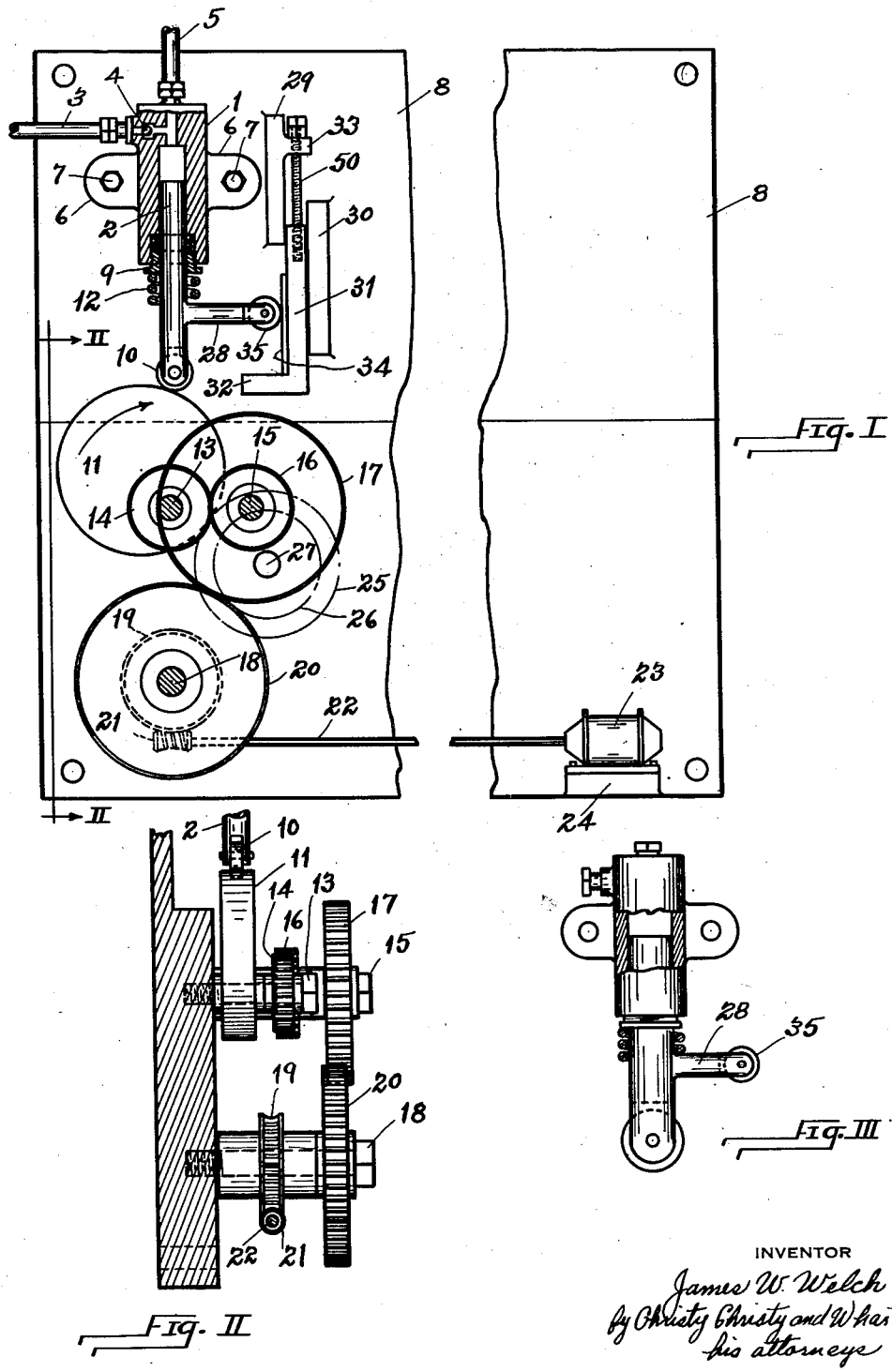

1,930,297

UNITED STATES PATENT OFFICE 1,930,297

LUBRICATING APPARATUS

James W. Welch, Oakland, Calif., assignor of one-half to Raymond P. Suess, Pittsburgh, Pa.

Application October 15, 1931. Serial No. 569,092

3 Claims. (Cl. 184—27)

The invention concerns the lubrication of paper mill rolls, blooming mill rolls, and other machinery requiring high pressure or forced lubrication. More particularly the invention relates to apparatus for effecting the delivery of lubricant under such pressures and in such quantities as the machinery to be lubricated requires. Admittedly in its broader aspect apparatus of this nature is known to the art, but to my knowledge none of the known apparatus affords the desired regulation of lubricant delivery.

The object of my invention is to provide a power lubricator which readily admits of lubricant control—control admitting of a particularly wide variation in the delivery of lubricant. Simplicity and economy of structure are other things I have in mind.

An embodiment of the invention is shown in the accompanying drawing, in which Fig. I is a fragmentary view of a machine bed or frame, carrying lubricant-feeding means, such means being illustrated partly in side elevation and partly in vertical section. Fig. II is a view in cross section, taken on the plane denoted by the line II—II of Fig. I; and Fig. III is a view, showing, partly in front elevation and partly in vertical section, an interchangeable unit of the apparatus.

The apparatus comprises a cylinder 1, a plunger 2 reciprocable in the cylinder, to draw in lubricant from a supply line 3, through a suitable valve 4, and to discharge the lubricant under pressure into a delivery conduit 5. The conduit 5 is connected to the roll neck, journal or other machine part to be provided with forced lubrication. The cylinder includes two side ears 6 through which screws or bolts 7 pass, to secure the cylinder to a frame, which in this case is shown to be an unspecialized, cast metal frame 8. According to well known practice and for manifest reasons the cylinder 1 is provided with a packing gland 9.

The end of the plunger 2 is provided with a roller 10 adapted to ride a cam or eccentric 11, and a compression spring 12 is organized on the plunger (Fig. I), exerting forces tending to maintain the roller 10 upon the peripheral face of the cam. The eccentric is secured (conveniently by means of a machine screw 13) for rotation on the bed or frame 8, and manifestly rotation of the eccentric will effect reciprocation of the plunger 2. Variable speed means are organized to effect rotation of the eccentric, and advantageously such variable speed means comprise a system of interchangeable gearing. The system of gearing includes a gear 14 secured to the eccentric and revoluble on screw 13; on the shank of a screw 15 two united gears 16 and 17 are revoluble, the gear 16 meshing with gear 14; on the shank of a machine screw 18, a worm gear 19 is united with a gear 20; the gear 20 meshes with the gear 17, and a worm 21, secured to a shaft 22, meshes with the worm gear. A variable speed motor 23 is mounted upon a convenient support 24 on the frame 8. The motor is adapted to drive the shaft 22, which by means of the gearing above mentioned effects rotation of the eccentric 11.

While I have shown only one cylinder and plunger unit secured to the frame 8, it will be understood and readily perceived that a plurality of such units may be arranged in series on the frame, and that the shaft 22 may be equipped with a worm (21) to drive the gearing of each of such units.

The motor 23 is a variable speed motor—a thing of known structure, and in being a motor of such character admits of group control of all gearings driven by it. That is to say, when two or more units are secured to the frame 8 and adapted to be driven by the shaft 22, the regulation of motor 23 will, within the speed range of the motor, permit group adjustment of the delivery of all pumping units on the frame 8. However, the range of control so permitted, while desirable, is not sufficient for all cases; greater variation in delivery is desired.

To the end that the output of each pumping unit may be regulated, I provide for interchangeability in the gearing associated with such unit. For example, if greater lubricant delivery is desired of a particular unit, I remove the pair of gears 16, 17 and substitute a pair of gears 25, 26 therefor, cf. dotted lines Fig. I. A suitably threaded hole 27 is provided in the frame 8 for the reception of machine screw 15, in which alternate position it serves to secure the substitute pair of gears. Gear 25 meshes with gear 14 and gear 26 with gear 20; so, in providing a set of several interchangeable gear units (such as the units 16, 17 and 25, 26), each of different gear ratio, it will be perceived that the speed of the eccentric 11 and the accompanying reciprocations of the plunger 2 may be varied over a wide range.

Still another adjustment of the delivery of each pumping unit is provided for: The cylinder and plunger are removable as a unit from the frame 8, and another cylinder and plunger unit of different cylinder volume is substituted therefor. That is, the supply line 3 and the delivery line 5 are disconnected from cylinder 2, the screws 7 are withdrawn, and the cylinder and plunger as a unit are removed from frame 8. Then a substitute unit—a unit of different capacity—is secured in its place. Such a substitute unit is illustrated in Fig. III of the drawing, and in an exemplary way such substitute unit is shown as having a cylinder of greater bore, which of course will give an increased delivery of lubricant when incorporated in the apparatus.

Up to this point of the specification I have shown two means for varying the speed of the pumping units, and interchangeability of structure for accomplishing a variation in the stroke volume of each pumping unit—in all I have shown three different adjustments for regulating the delivery of the apparatus. There is still another adjustment which I provide for—a finer and more delicate adjustment—an adjustment of the stroke of each plunger.

As will be noted in Figs. I and III, the plungers of the pumping units are each provided with a laterally extending arm 28. Between two backing bosses 29, 30 on the frame 8, a block 31 is positioned. I show the block 31 as including a foot or stop 32, and an adjusting screw 50 extending through a stationary lug 33 and into threaded engagement with the block (31). Accordingly, the block may be adjusted in a line extending in parallelism with the movement of plunger 2, whereby the foot or stop 32 may be stayed in such elevation as to engage the arm 28 during the downward stroke of the plunger 2. In so engaging the arm, the plunger may be held from contact with the eccentric 11 for a portion of its throw, thus decreasing the stroke of the plunger. It will now be manifest that a fine variation in the stroke of the plunger can be effected in this manner, and corresponding adjustments in the delivery of lubricant obtained. This makes a fourth adjustment for the control of lubricant delivery.

Another advantage is obtained through the use of the particular structure which I employ, to adjust the stroke of the plunger 2. It is this. The eccentric, in rotating to effect reciprocation of the plunger (the arrow in Fig. I indicates the rotation), exerts a lateral thrust upon the plunger, and, if this thrust were not adequately opposed, it would cause chattering and such vibrations as to crystallize the metal of the moving parts of the apparatus. Of course, such crystallization results in machine failure. To overcome the lateral thrusts exerted on the plunger, and to prevent undue vibrations, I provide a facing block 34 on the adjustable block 31. The arm 38 rides against the facing block 34 during reciprocation of the plunger 2, and supports the plunger in the manner desired. Indeed, the arm 28 is provided with an antifriction bearing 35, to the end that the operation will be smooth and efficient. It will be observed that the boss 30 on frame 8 is of heavy structure, affording a sturdy backing for the blocks 31, 34 which support the plunger against the lateral strains above mentioned.

I claim as my invention:

1. In a power lubricator including a cylinder having a plunger operable therein for the forceful feeding of lubricant, the combination of a cam and a spring associated with said plunger, together with means for effecting rotation of said cam, whereby reciprocation of the plunger is effected, a lateral support extending from the plunger and provided with a bearing adjacent its end, and a block against which said bearing is adapted to ride, supporting the plunger against such lateral thrusts as the revolving cam exerts upon it, said block being adjustable to vary the stroke of said plunger.

2. In a power lubricator including a cylinder having a plunger operable therein for the forceful feeding of lubricant, the combination of a cam and a spring associated with said plunger, together with means for effecting rotation of said cam, whereby reciprocation of the plunger is effected, an arm extending laterally from said plunger and carrying an antifriction bearing, a block against which said bearing is adapted to ride, supporting the plunger against such lateral thrusts as the revolving cam exerts upon it, said block including a stop and being provided with means for its adjustment, whereby the stop cooperates with said arm for regulation of the stroke of said plunger.

3. In a power lubricator including a cylinder having a plunger operable therein for the forceful feeding of lubricant, the combination of a cam and a spring associated with said plunger, together with means for effecting rotation of said cam, whereby reciprocation of the plunger is effected, a lateral support extending angularly with respect to said plunger, a bearing block, which support rides said bearing block and reacts against such lateral thrusts as the revolving cam exerts upon said plunger, and adjustable means associated with said support for regulation of the stroke of said plunger.

JAMES W. WELCH.